Figure 1:
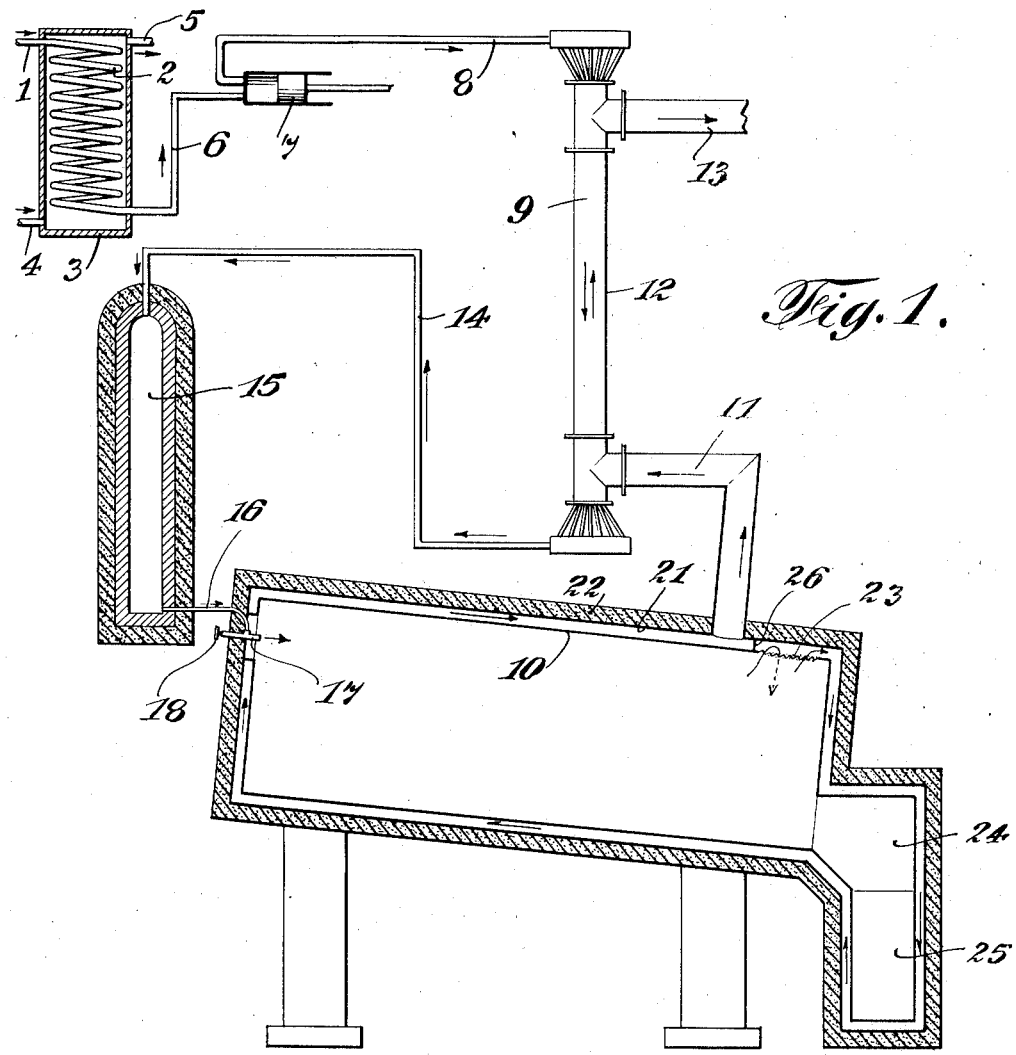

Feb. 14, 1928.

J. W. MARTIN, JR 1,659,435

METHOD OF AND APPARATUS FOR MAKING CARBON DIOXIDE SNOW

Filed Dec. 7, 1926

INVENTOR.
James W. Martin, Jr.
BY
G. C. Allan ATTORNEY

Patented Feb. 14, 1928.

1,659,435

UNITED STATES PATENT OFFICE.

JAMES W. MARTIN, JR., OF YONKERS, NEW YORK, ASSIGNOR TO DRYICE CORPORATION OF AMERICA, OF NEW YORK, N. Y., A CORPORATION OF DELAWARE.

METHOD OF AND APPARATUS FOR MAKING CARBON-DIOXIDE SNOW.

Application filed December 7, 1926. Serial No. 153,064.

My present invention concerns large quantity production of solidified carbon dioxide in the form of so-called carbon dioxide snow and compression thereof to form dense, structurally coherent blocks such as are now going into extensive use for refrigeration and similar purposes.

As is well known, carbon dioxide cannot exist as a liquid, at atmospheric pressures, but the snow, when formed, is stable at atmospheric pressures and temperatures and can be handled as a commercial product although its evaporation temperature is approximately 110° below zero Fahrenheit. Upon melting, it simultaneously absorbs the latent heats both of liquefaction and boiling, thereby sublimating from solid directly to gas form, at atmospheric pressures.

The carbon dioxide snow is produced from carbon dioxide which is maintained in liquid form by subjecting it to critical temperature and pressure of liquefaction. The highest critical temperature is about 88° F. and the corresponding critical pressure is 1075 pounds per square inch, but ordinarily the liquid is stored in and used from tanks that are at ordinary room temperature, say, 60° F., the critical pressure being about 750 pounds. The liquid is transformed to crystalline or snow form by releasing the pressure to permit sudden gasification of the liquid and expansion of the resultant gas. Ordinarily it requires evaporation of 3 to 4 pounds of the liquid to freeze one pound to snow form and, for such temperatures and pressures, the theoretical limit is near 2 pounds evaporated for 1 pound frozen.

As contrasted with this, my present invention contemplates certain novel steps whereby the percentage of snow may be greatly increased. I have discovered that if the liquid be cooled far enough while corresponding decrease in pressure is prevented and if while in this condition the liquid is permitted to expand freely, the snow yield at the lower range of temperatures, will increase disproportionally with each degree of drop. In a particular case, where the apparent yield from liquid at 60° F. was about 29%, low temperatures gave accelerating increases up to 46% at −50° F., the plotted curve indicating that at −80° F. the yield would have been 60%, the 140° drop doubling the yield of snow. These increases are far greater than can be accounted for by mere reduction in the sensible heat (calories) in the liquid and indicate a hitherto unknown or at least unutilized phenomenon or factor that can revolutionize the commercial art of making carbon dioxide snow.

In the patent to Slate 1,546,682, it is proposed to apply the exit gas countercurrent on the incoming liquid before returing it to the compressor and, while this idea seems to be new in the art, it will be found that the specific heat of the gas is only about one-fifth that of water and that the refrigerant values that can be derived from such part of the liquid as becomes waste gas, can have but relatively small cooling effect on the total incoming liquid. Such cooling is much too small to utilize or even lead to discovery of the above described phenomenal consequence, namely, the accelerating curve of increasing snow yield that results from super-cooling in accordance with my present invention. To get my results, special means must be employed for super-cooling to lower temperatures than can be obtained by countercurrent of the waste gas from the snow making process. So, where I employ the waste gas as countercurrent, as I prefer to do, it is not as a substitute for such special refrigerant means, but rather as a convenient supplemental means for further reduction of temperature of the liquid after it has already been substantially super-cooled by the primary super-cooler.

I find further, that the liquid is compressible and that the snow yield is further increased by compressing the liquid far beyond critical, or, say, 1100 lbs. or 1700 lbs. or more. This has several effects: The high pressure maintains clear up to the nozzle orifice a powerful elastic follow-up, whereby a greatly increased weight of liquid may be expanded from minimum space as determined by the area of the nozzle. Such high pressure will force the liquid from the nozzle at such high speed that the nozzle will not have time to freeze the incoming liquid. Even if portions of the liquid are frozen, the high elastic pressure will force the ice out of the nozzle. The important point, however, is that first mentioned, namely, the increase in snow yield due to the various contributing factors that I utilize.

For the above reasons, I not only liquefy the carbon dioxide but also cool the liquid by a large capacity cooler such as a brine tank, down to approximately 0° F. and thereafter apply the waste gas countercurrent to effect the further cooling down as near as may be to the freezing point of the liquid. During the brine cooling, the follow up pressure from the source will be maintained and preferably, also, an accelerating booster will be employed for increasing the pressure of the cooled liquid for the purposes herein described.

While my invention does not depend on theory, it may be well to note my present belief that my novel results depend on avoiding the idea that for maximum cooling effect, the expanding liquid should do work, and I provide free, unimpeded expansion, thereby utilizing a cooling action that seems akin to the Joule-Thomson effect, which is four to six times greater for carbon dioxide than for any other gas. However, regardless of theory, it is a fact that neither abstracting sensible heat below the critical temperature of the liquid, nor increasing pressure beyond critical pressure has ever been considered worth while. Mere heat abstraction can be accomplished more economically on a higher temperature plane; and my discovery is that great lowering of the temperature at this particular point in the cycle, is phenomenally important and results in a great practical economy, even though the extraction of calories at the low temperature range may be substantially more expensive. Great pressures are similarly expensive; but it is my discovery that it is well worth while to apply pressures beyond and preferably far beyond critical. In practice, the above described disproportionate increase of yield may be had at minimum expense by a preliminary supercooling of the liquid to or below zero F., and I prefer to have it but little above the freezing point of the liquid.

In this connection, it will be understood that "critical" is herein used to designate the normal condition of temperature-pressure balance that automatically maintains itself in any ordinary container having liquid carbon dioxide therein. Hence as herein used "below critical temperature" and "pressure greater than critical" are in a sense interdependent or interchangeable expressions. For instance, if the liquid at a balanced or "critical" temperature-pressure of 60° F. and 750 pounds per square inch, be cooled to zero F. as above suggested, and the shrinkage is taken care of by holding the pressure unchanged at 750 pounds, the liquid may be said then to be 60° below critical temperature; or, looking at it another way, 450 pounds above critical presure. A similar condition could be obtained by taking liquid at any given critical temperature and pressure and increasing the pressure while preventing corresponding rise in temperature. So for practical purposes, the expression "super-cooled" may be used whether the desired condition is attained by cooling, while preventing corresponding fall in pressure, or by increasing pressure while preventing rise of temperature, or by both cooling and increasing pressure.

Further objects of my invention are to increase the percentage yield of the snow by preventing turbulence or bubbling in the liquid in the zone of its approach to the nozzle, where its velocity is accelerated at a high rate, and also to prevent turbulence in the expanding gas outside of the nozzle while permitting it to expand as quickly as possible.

Another important feature is affording a large snow forming space in the expansion chamber as contrasted with the present common practice of employing bags, small screen cylinders and small chambers. I prefer to afford a snow-forming and snow-settling space, which may be approximately 4 cubic feet per pound of liquid per minute; also to make the chamber long, say, 15 or 20 feet, so that there will be no impingment of the snow jet or drafts therefrom at the far end of the chamber.

Turbulence at the nozzle is minimized by providing a smoothly curving contraction from the full diameter of the supply pipe to the outlet orifice and a smooth, rapidly expanding curve beyond the orifice to afford free but guided expansion for the gas. By avoiding turbulence, eddy formation and undue release of pressure within the body of the liquid, I avoid formation of gas bubbles in the liquid stream. This is important, since already formed gas has a much lower order of expansion than liquid changing to gas. Moreover, bubbles of gas in the liquid stream tend to break up the cone of liquid that extends outward from the discharge orifice when the latter is properly formed in accordance with my present invention. By maintaining an inner cone of dense, bubble-free liquid, the gas formation is localized at the surface thereof, and the liquid cone is surrounded by a sheath of expanding snow forming gas, the refrigerating effect of which on the liquid cone tends to cause direct freezing of the latter.

The advantages of my invention will be evident from appreciation of the fact that the cold—which is of course but the absorption of heat or energy—is caused by the molecules separating from one another, i. e., expansion. The more quickly and more completely this expansion takes place, the greater is the energy or heat absorbed in a given length of time; therefore, the lower the temperature obtained. If mechanical work is done by the gas in expanding, energy is wasted by back pressure on the source and by heat absorbed from or generated by impact upon metal, and the time and place of refrigerative expansion are increased, instead of concentrated, thereby preventing the generation of the desired temperatures.

The chamber or vessel into which carbon dioxide is expanded should be sufficiently long in one direction to prevent the impinging of the gas stream upon any substance, thus minimizing losses due to generation of heat and electricity as well as turbulence in the gas stream. In addition, the chamber should be of sufficient cross-section to serve as a settling chamber, affording a relatively stagnant atmosphere for coalescing solid particles into aggregates of sufficient size to slow down their melting rate and also prevent their being swept out of the chamber with the exit gas. My invention thus includes recognition of the fact that making of solid carbon dioxide is a crystallization phenomenon though the fluid medium is gaseous. Hence the reaction requires volume, and the crystallizing medium should be kept at or below its freezing point as long as possible.

Figure 2:
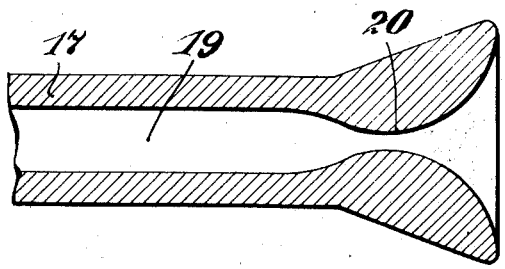

The above and other features of my invention will be more evident from the following description in connection with the accompanying drawings, in which Fig. 1 is a diagrammatic view in section, showing apparatus suitable for practise of my present invention; and Fig. 2 is an enlarged detail view in longitudinal section, showing my improved form of snow making nozzle.

In these drawings, the pipe 1 is supplied with liquid carbon dioxide under pressure, from a suitable source, preferably a liquefying machine. As before explained, the liquid carbon dioxide delivered to this pipe will have been compressed and the excessive heat of compression removed so that the liquid is at approximately atmospheric temperature, the corresponding pressure being, say, 780 pounds. The liquid supplied through pipe 1 flows through a cooling coil, 2, in a tank, 3, kept full of cold brine supplied through pipe 4 and returning through pipe 5 to any suitable refrigerating machine not shown. Preferably, the brine will be maintained at a temperature sufficient to reduce the liquid to a temperature of about zero Fahrenheit, although a lower temperature may be desirable when my process is being practised with greatest efficiency, as explained below. The cold liquid flows through pipe 6 to a booster compressor, 7, where the liquid is subjected to the desired pressure, say, from 700 to 800 pounds up to 1100 or 1200 pounds, much higher pressures up to, say, 1700 pounds, and even far higher pressures, being desirable and the limit being determined by practical considerations.

The thus chilled and highly compressed liquid then flows through pipe 8 to the cooler, 9, maintained at low temperature by the countercurrent flow of waste gas escaping from the snow chamber, 10, and flowing through pipe 11, jacket, 12, and thence through pipe 13 back to the liquefying machine. The liquid still under the original follow up pressure and now reduced to very low temperature, preferably near the freezing point of carbon dioxide, flows through pipe 14 to a pressure reservoir, 15, whereby a body of the highly compressed and elastically expansive liquid is maintained in close supply relation to the pipe 16 leading to the snow making nozzle, 17, the inlet to which is controlled by valve handle 18.

As before explained, these pipes and the nozzle passages will all be of ample flow capacity and negligible resistance, so that the maximum pressure will be available at the outlet of the nozzle, nowithstanding the free release of the liquid through said nozzle. As a result, there will be no low pressure points is the supply pipes, where gas can form. Consequently, the liquid will remain solid, that is, bubbleless up to the nozzle.

The preferred form of nozzle, as shown in Fig. 2, has the supply passage, 19, which as above described, is of great flow capacity as compared with the outlet orifice. 20. A novel feature of this nozzle is the smooth curvature from the maximum cross-section of the supply passage 19 down to the minimum cross-section of the outlet. This prevents possibility of eddy formation within the nozzle and ensures smooth, high, follow-up pressure discharge of solid, that is, bubbleless liquid. Beyond the narrowest point of the orifice at 20, the nozzle is bell-shaped, its precise contour being determined by the expansion rate of the gas evolved from the liquid 1, guiding the expansion, without confining it. I have discovered that by this means and particularly by reason of the elastic expansibility of the highly compressed liquid, a practically bubbleless jet of liquid may be projected several inches from the nozzle orifice, though the latter be not more than 1/16 inch in diameter.

The primary elastic expansion of the liquid when released from pressure will cause some cooling effect, but the most important function of the liquid expansion is the preservation of a quiet bubbleless cone of the liquid, with a very definite surface affording a most concentrated locus in which gas is evolved at an extraordinarily high rate. The cooling factors are the above described expansion of the liquid as such; the vaporization and absorption of latent heat to change the liquid to a gas; the expansion of the gas as such; and the Joule-Thomson effect, which is phenomenally great for carbon dioxide, when allowed to expand freely and quietly without doing any work. When the liquid is sufficiently super-cooled, the result is greatly increased snow yield, which has been described above; and when the liquid is greatly compressed before release the yield is correspondingly greater.

The preservation of the liquid cone and further increase of snow yield is promoted by having the snow tank, 10, into which the nozzle discharges, of great volume as well as of great length. For expanding, say, 1,000 lbs. of liquid per hour, it may be 20 feet long by 4 feet in diameter. It may consist of an inner metal casing 10, spaced apart from an outer metal casing, 21, protected by heavy heat insulating material, 22. The gas evolved at the jet escapes through a screen, 23, at the upper far end of the snow chamber and flows downward and all around the inner tank 10, thus maintaining the latter at the lowest possible temperature.

The long, large-volume, heat-insulated snow chamber ensures an atmosphere for the jet which is approximately at the freezing point of the carbon dioxide, and the great volume of the tank promotes immediate loss of velocity of escaping gas and affords a quiet atmosphere well adapted to promote formation of snow crystals of maximum size. In this connection, it is to be remembered that the snow making process includes initially the reduction of temperature of molecules to below the freezing point, followed by agglomeration of molecules to form crystals and then growth of the crystals so formed by addition of further molecules that are at or below the freezing temperature. Turbulence in the atmosphere naturally tends to the formation of smaller crystals, besides friction and heat evolution. Moreover, if the convection currents are rapid, molecules that are reduced below freezing may easily escape to a warm region, where they can be heated above freezing point before they have a chance to crystallize out.

The snow chamber is shown as inclined for the purpose of facilitating clearing out of snow at the far end of the chamber, in a bin, 24, to which access may be had through a door, 25.

This snow chamber may be and preferably is, provided with agitating scrapers for clearing the snow that collects on the inner surface of shell 10, as described in a companion application of even date herewith, and the exit, 25, may be the path of movement of a compressor as shown in said companion application.

From the above, it will be evident that turbulence, eddying and other internal working in the liquid is minimized by making the supply conduit large and of low flow resistance up to a point adjacent the nozzle, and that from there on smooth acceleration of the liquid through the orifice and projection thereof in stable jet form is ensured by making the nozzle along lines prescribed for maximum flow of fluids. With such an arrangement, the speed of flow of the liquid into the jet is greatly accelerated by reason of the great elasticity of the liquid when subjected to pressures much greater than critical. As above noted, liquid carbon dioxide is unlike any other liquid, in that it is phenomenally compressible and, when compressed far beyond critical pressures, it becomes an elastically expansible fluid, automatically maintaining a follow-up pressure in a manner impossible with any other liquid. Consequently, the velocity of the jet through the extremely cold tip of the nozzle will be sufficient to prevent clogging of the outlet, and to ensure a long stable jet with a well defined surface closely adjacent which the gasifying expansion and resultant refrigerative effect, is localized, thereby producing the most intense cold in the most concentrated form with the resulting great increase of snow yield, as above described.

While I have given reasons for believing that the efficiencies of my method result from a novel development of the Joule-Thomson effect, the novel operations and results thereof are the essentials of my invention, and theories are offered, not because they are necessarily correct, but because proceeding as if they were correct is likely to be an assistance toward securing the best results.

I claim:

1. Apparatus for making carbon dioxide snow, including a discharge nozzle and means for supplying said nozzle with liquid carbon dioxide under sustained follow up pressure and means in advance of the nozzle for super-cooling the liquid far below the critical temperature corresponding to said pressure.

2. Apparatus for making carbon dioxide snow, including a discharge nozzle and means for supplying said nozzle with liquid carbon dioxide including means in advance of the nozzle for super-cooling said liquid far below 60° F. and for maintaining pressure thereon far greater than 750 pounds per square inch.

3. Apparatus for making carbon dioxide snow, including a large conduit of relatively large cross-section, smoothly contracting to a small area outlet terminating in a pseudo spherical mouth, adapted to afford free but guided expansion of gases from the jet.

4. Apparatus for making carbon dioxide snow, including a source of liquid carbon dioxide at normal liquefying pressure and temperature and conduits serially including independently maintained refrigerator means for super-cooling the liquid a booster compressor applying pressures greater than critical to maintain the liquid under elastic compression, a reservoir filled with super-cooled, compressed liquid and, adjacent the latter, an expansion nozzle and a large volume settling chamber into which said nozzle discharges, the walls of said chamber being protected by an exterior insulating jacket and affording an interspace through which said gases escape.

5. Apparatus for making carbon dioxide snow, including a source of liquid carbon dioxide at normal liquefying pressure and temperature and conduits serially including independently maintained refrigerator means for super-cooling the liquid, a booster compressor applying pressures greater than critical to maintain the liquid under elastic compression, a counter-current cooler for super-cooling the compressed liquid, a reservoir filled with super-cooled, compressed liquid and, adjacent the latter, an expansion nozzle and a large volume settling chamber into which said nozzle discharges, the walls of said chamber being protected by an exterior insulating jacket and affording an interspace through which said gases escape to the countercurrent cooler.

6. The method of making carbon dioxide snow from commercial liquid carbon dioxide by releasing it from pressure, which method includes cooling the liquid below 0° F., compressing the liquid by pressure substantially greater than its critical pressure for its temperature and discharging the thus super-cooled and compressed liquid through a restricted nozzle.

7. The method of making carbon dioxide snow from commercial liquid carbon dioxide by releasing it from pressure, which method includes cooling the liquid below 0° F., compressing the liquid by pressure substantially greater than its critical pressure for its temperature and discharging the thus super-cooled and compressed liquid through a restricted nozzle, and maintaining the gaseous and solid products of the expansion in a relatively large volume intensely cold atmosphere produced by such expansion.

8. The method of making carbon dioxide snow from commercial liquid carbon dioxide by releasing it from pressure, which method includes cooling the liquid to a point near but above freezing thereof, compressing the liquid by pressure substantially greater than its critical pressure for its temperature, preventing turbulence and permitting free sudden expansion of said liquid by discharge through a nozzle of the maximum flow type.

9. The method of making carbon dioxide snow from commercial liquid carbon dioxide by releasing it from pressure, which method includes cooling the liquid to a point near but above freezing thereof, compressing the liquid by pressure substantially greater than its critical pressure for its temperature, preventing turbulence and permitting free sudden expansion of said liquid by discharge through a nozzle of the maximum flow type, and maintaining the gaseous and solid products of the expansion in a relatively large volume intensely cold atmosphere produced by such expansion.

10. The method of making carbon dioxide snow from commercial liquid carbon dioxide by releasing it from pressure, which method includes compressing the liquid by pressure substantially greater than its critical pressure for its temperature, discharging the thus compressed liquid through a restricted nozzle.

11. The method of making carbon dioxide snow from commercial liquid carbon dioxide by releasing it from pressure, which method includes compressing the liquid by pressure substantially greater than its critical pressure for its temperature, discharging the thus compressed liquid through a restricted nozzle and maintaining the gaseous and solid products of the expansion in a relatively large volume intensely cold atmosphere produced by such expansion.

12. The method of making carbon dioxide snow from commercial liquid carbon dioxide by releasing it from pressure, which method includes cooling the liquid, compressing the liquid by pressure substantially greater than its critical pressure for its temperature and discharging the thus super-cooled and compressed liquid through a restricted nozzle.

13. The method of making carbon dioxide snow from commercial liquid carbon dioxide by releasing it from pressure, which method includes cooling the liquid, compressing the liquid by pressure substantially greater than its critical pressure for its temperature and discharging the thus super-cooled and compressed liquid through a restricted nozzle and maintaining the gaseous and solid products of the expansion in a relatively large volume intensely cold atmosphere produced by such expansion.

14. The method of making carbon dioxide snow from commercial liquid carbon dioxide by releasing it from pressure, which method includes cooling the liquid, compressing the liquid by pressure substantially greater than its critical pressure for its temperature and preventing turbulence and permitting free sudden expansion of said liquid by discharge through a nozzle of the maximum flow type.

15. The method of making carbon dioxide snow from commercial liquid carbon dioxide by releasing it from pressure, which method includes cooling the liquid, compressing the liquid by pressure substantially greater than its critical pressure for its temperature, preventing turbulence, permitting free sudden expansion of said liquid by discharge through a nozzle of the maximum flow type, and maintaining the gaseous and solid products of the expansion in a relatively large volume intensely cold atmosphere produced by such expansion.

16. Apparatus for making carbon dioxide snow, comprising a snow chamber, a discharge nozzle therein, and means for supplying said nozzle with liquid carbon dioxide of a pressure greater than the critical pressure for its temperature, said snow chamber being of large flow section and great length as compared with the volume and velocity of the jet from the discharge nozzle.

17. Apparatus for making carbon dioxide snow, comprising an insulated settling chamber, a discharge nozzle therein, and means for supplying said nozzle with liquid carbon dioxide of a pressure greater than the critical pressure for its temperature, said insulated settling chamber being of large flow section and great length as compared with the volume and velocity of the jet from the discharge nozzle.

18. In an apparatus for making carbon dioxide snow, a settling chamber, a discharge nozzle therein comprising a conduit of relatively large cross-section, smoothly contracting to a small area outlet terminating in a pseudospherical mouth, and means for supplying said nozzle with liquid carbon dioxide of a pressure greater than the critical pressure for its temperature.

19. The method of efficiently vaporizing and expanding liquid carbon dioxide to make snow, comprising cooling the liquid below its critical temperature, applying pressure greater than the critical pressure at this temperature to render the liquid elastically expansive, and affording sudden free expansion of the liquid from its compressed, supercooled condition, approximately to atmospheric pressure.

20. The method of efficiently vaporizing and expanding liquid carbon dioxide to make snow, comprising cooling the liquid below its critical temperature, applying pressure greater than the critical pressure at this temperature to render the liquid elastically expansive, and affording sudden free expansion of the liquid from its compressed, supercooled condition, approximately to atmospheric pressure while maintaining a large slow-moving body of the resultant snow and carbon dioxide gas in receiving relation to said expanding liquid.

21. The method of efficiently vaporizing and expanding liquid carbon dioxide to make snow which includes cooling the liquid below its critical temperature, maintaining a pressure of said liquid greater than the critical pressure at this temperature, and permitting sudden free expansion of said liquid from its supercooled condition approximately to atmospheric pressure.

22. Apparatus for making carbon dioxide snow comprising a settling chamber of great length as compared to its diameter, a source of supply of liquid carbon dioxide outside said chamber, and a nozzle communicating with said source of supply and discharging lengthwise within said chamber at one end and adjacent the upper portion thereof, said settling chamber being large enough to permit free expansion of the carbon dioxide jet to avoid turbulence.

23. Apparatus for making carbon dioxide snow comprising a settling chamber of great length as compared to its diameter, a source of supply of liquid carbon dioxide outside said chamber, a nozzle communicating with said source of supply and discharging lengthwise within said chamber at one end and adjacent the upper portion thereof, said settling chamber being large enough to permit free expansion of the carbon dioxide jet to avoid turbulence, and an insulating jacket protecting the walls of said chamber and affording an interspace through which the waste cold gases escape.

24. Apparatus for making carbon dioxide snow comprising a settling chamber of great length as compared to its diameter, a source of liquid carbon dioxide outside said chamber, adapted to deliver the liquid at normally constant rates, and a nozzle communicating with said source and formed with a constricted passage leading to an expanding outlet discharging lengthwise within said chamber from adjacent the upper end thereof, said settling chamber being large enough to permit free expansion of the carbon dioxide to avoid turbulence.

Signed at New York, in the county of New York and State of New York, this 4th day of December, A. D. 1926.

JAMES W. MARTIN, Jr.